Oct. 13, 1925.  
F. STOFFER  
1,557,377  
CONTROLLING DEVICE OF HYDRAULIC RAMS  
Filed April 23, 1924  
3 Sheets-Sheet 1

Fig. 1.

Frank Stoffer,
INVENTOR

BY Victor J. Evans
ATTORNEY

WITNESS: Gerald Hennesy

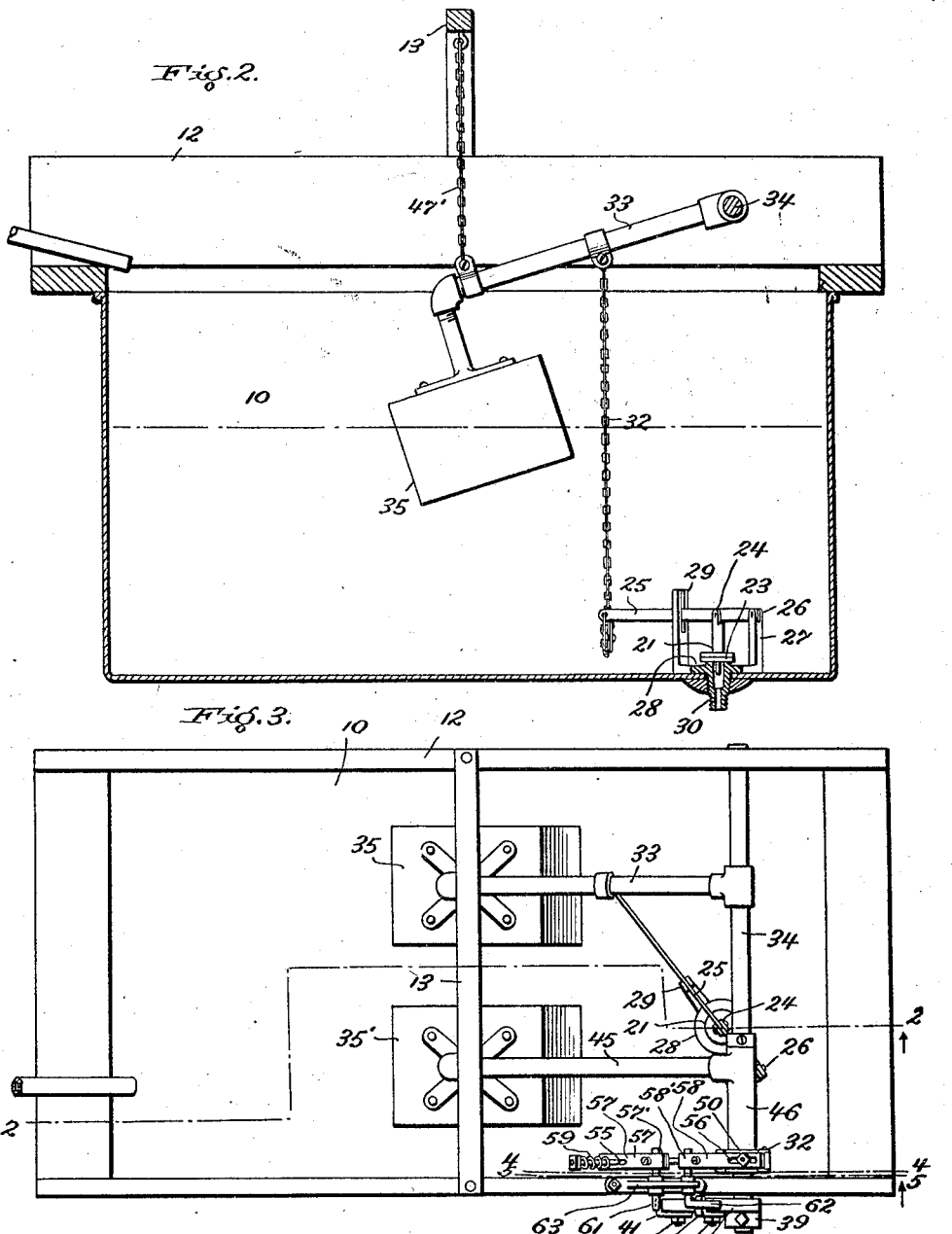

Oct. 13, 1925.
F. STOFFER
1,557,377
CONTROLLING DEVICE OF HYDRAULIC RAMS
Filed April 23, 1924 3 Sheets-Sheet 3
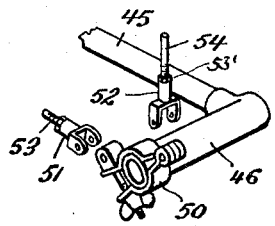
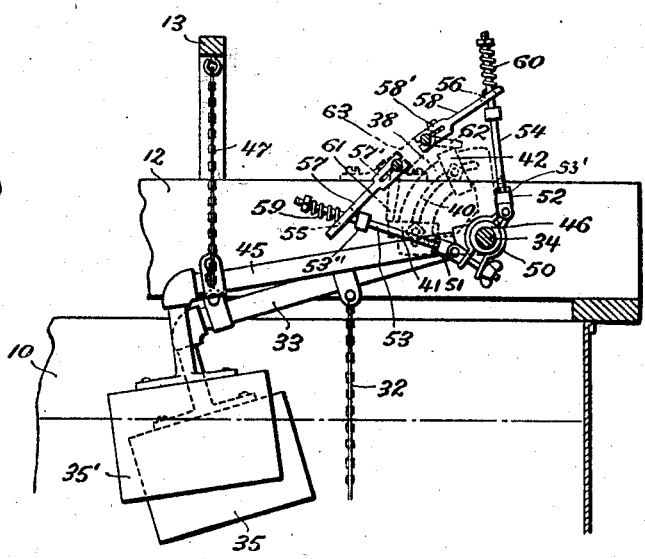
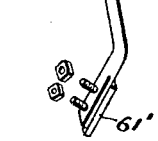
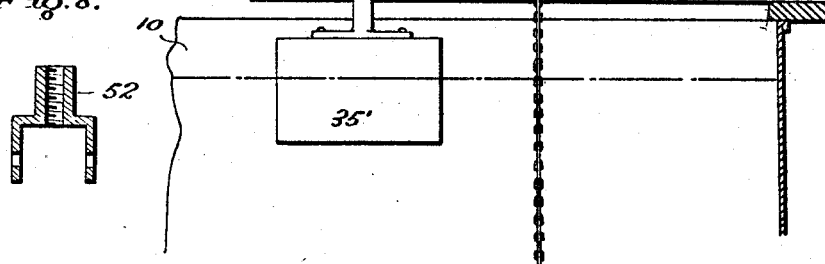
Frank Stoffer
INVENTOR
BY Victor J. Evans
ATTORNEY
WITNESS: Gerald Hennessy Patented Oct. 13, 1925.

1,557,377

UNITED STATES PATENT OFFICE.

FRANK STOFFER, OF FENELTON, PENNSYLVANIA.

CONTROLLING DEVICE OF HYDRAULIC RAMS.

Application filed April 23, 1924. Serial No. 708,582.

*To all whom it may concern:*

Be it known that I, FRANK STOFFER, a citizen of the United States, residing at Fenelton, in the county of Butler and State of Pennsylvania, have invented new and useful Improvements in Controlling Devices of Hydraulic Rams, of which the following is a specification.

The object of this invention is to provide means for controlling the flow of water to a hydraulic ram, so that when the flow is not sufficient to produce the operation of the ram in the manner usual for that class of apparatus, the ram may be caused to operate at frequent intervals by temporarily storing sufficient water for the purpose, and automatically discharging the water to the supply pipe leading to the ram, and thereafter cutting off the flow to permit of the further accumulation of water.

A further object is to effect control by devices themselves controlled by the water level at the source of supply.

A still further object is to avoid the waste of water incident to the starting and stopping of the operation of the ram, this being a result of so constructing the device and arranging the valves that the supply line will be kept filled with water.

In the drawings, Figure 1 shows the device in side elevation, with parts in dotted lines and in section; Figure 2 is a vertical section (on line 2—2 of Figure 3) through the tank, representing a body of water, or the retaining means therefor; Figure 3 is a top plan view; Figure 4 is a section on line 4—4 of Figure 3; Figure 5 is a similar view, both floats having been raised to their upper position; Figure 6 is a detail showing certain connections of sleeve 46 which in Figures 4 and 5 is mounted on rock shaft 34; Figure 7 shows a modified form of latch having a steel shoe 61'; Figure 8 is a detail in section showing the threaded connecting device 52, which also appears at the right of Figure 5.

For convenience, the tank 10 will be assumed to represent a temporary storage reservoir of any description, to be supplied by a spring or stream. The operative elements of the controlling mechanism are mounted in a frame 12 including an upper transverse element 13.

A hydraulic ram is shown more or less conventionally and includes the housing 14 of an air chamber 15, and a discharge pipe 16 leading from this chamber, and further includes the supply pipe 17 connected with the reservoir 10, the impetus valve 18 at the far end of this pipe, and valve 19 controlling the passage 20 between air chamber 15 and pipe 17. Valve 19 is preferably of the type illustrated, having been found far more satisfactory in operation than a ball check valve.

The flow of water from reservoir or tank 10 to supply pipe 17 is controlled by valve or cut-off device 21. This element includes a plurality of disks 23, one of which may be of rubber, the stem of the valve having ears 24 between which lever arm 25 is pivoted. Element 25 is fulcrumed at 26 in post 27 projecting from base 28, and said element 25 is movable vertically in slotted upright 29 formed on the base. Also formed with base 28 is a flanged annular portion 30, for direct connection with supply pipe 17, and providing a seat for valve 21.

Lever arm 25 and valve 21 are lifted by chain 32 connected with arm 33 rigid with transverse shaft 34, the arm carrying at its outer end a float 35, controlled by the water level in tank 10, and controlled by float 35', in the manner described below.

Shaft 34 is mounted in bearings in frame 12, and the outer end thereof carries rigidly a segmental member 38 including a hub 39 fixed on the shaft,—the segmental portion being provided with a slot 40. Two stops 41, 42, are adjustable in this slot and are retained by bolts 43, 44 passing through the slot. The devices 41, 42 are shown as being of U form, and are engaged by the latches mentioned below.

Float 35' is carried by the outer end of arm 45 rigid with a collar or sleeve 46 loosely mounted on shaft 34. The downward movement of this arm is limited by chain 47, and the downward movement of the other arm and its float 35 is controlled by chain 47', these chains being suspended from upper transverse element 13.

A two-part clamp 50 is rigidly mounted on sleeve 46 and pivotally connected with opposite portions thereof—that is, on opposite sides of the rocking shaft 34 are forked and internally threaded members 51, 52, receiving threaded pins 53, 54, each carrying adjusting nuts at the points shown. These nuts 53' engage the ends of the threaded portions of elements 51, 52, and retain the pins after adjustment is secured.

Rigid collars 53'' on the pins contact with latch arms 57, 58, referred to below. Figure 8 shows one element 52 in section.

The pins 53, 54 pass through slots 55, 56 in latch arms 57, 58,—coiled springs 59, 60 on the pins 53, 54 bearing on the latch arms. Latches 61, 62 mounted in bracket 63 are clamped in the split ends 57', 58' of the latch arms, each latch including a shank (so clamped), and a right angled tapered portion for cooperation with stops 41, 42.

The elements are so proportioned that after float 35 is lifted slightly by the rise of water in the tank, its further movement is temporarily prevented by the lower latch 61 engaging the lower stop, preventing the rocking of shaft 34 because segment 38 rigid with the shaft is held by the lower latch 61 and its stop.

The water continues to rise until float 35' is raised sufficiently to free this lower latch 61 from its stop, which action is caused by the angular movement of sleeve 46, and clamp 50, and the thrust imparted to pin 53 carrying nut 53' which engages latch arm 57 and swings lower latch 61 outwardly, for clearing the stop, as indicated.

Float 35 becomes nearly submerged, and the release of the rock shaft 34 by lower latch 61 permits float 35 to suddenly move upward and open valve 21 in the bottom of the tank. This action is the result of pull on chain 32 controlling lever arm 25.

The upward movement of float 35 and corresponding movement or rocking of shaft 34 and segment 38 places upper stop 42 in position for engagement by the upper latch 62, acting under the influence of the upper coiled spring. This prevents reverse movement of shaft 34 and holds valve 21 open.

The water passes to the ram, which operates in the usual manner, and the fall of water in the tank 10, below a predetermined level, causes float 35' to drop and release upper latch 62, thereby permitting float 35 to drop suddenly and close valve 21 in the bottom of the tank. This closing action takes place when sufficient water has been discharged from the tank. Water is constantly flowing into the tank, the rate of flow being limited by the source of natural supply.

Valve 21 being closed, the ram ceases operation until the tank is again filled to the level required for the floats and associated devices to act in the manner just disclosed.

Before automatic operation commences, supply pipe 17 and discharge pipe 16 should be full of water, and it is assumed that chamber 15 of the ram is filled with air. If the water supply is at times greater than that required for the ram, surplus water will overflow from the tank.

The device can be made to operate with only upper latch 62 in action. For this purpose chain 32 is made of the correct length for opening valve 21 when the tank fills to the level required for float 35 to overcome the weight of the valve. The timing of the action of the upper latch is made to correspond with the new conditions. In practice, the control first described has been found most satisfactory.

It should be added that the latches may be of hard steel, and that the stops, also of steel, may when worn be turned end for end. Later, the upper stop may be substituted for the lower stop and vice versa, so that all available surfaces may be used, and the period of usefulness of these elements may be proportionately increased.

In a slightly modified form, the latches are shown as having steel shoes 61', the body portion being of softer material if desired.

What I claim is:

1. In a device of the class described, a pipe for connection with a hydraulic ram, a valve for closing the pipe, and means controlling the valve, said means including a float for opening the valve, a second float controlling the action of the float first named, concentric shafts, and means for mounting the floats, respectively, on said shafts.

2. In a device of the class described, a pipe for connection with a hydraulic ram, a valve for closing the pipe, and means for controlling the valve, said means including a float for opening the valve, and a second float controlling the float first named, concentric shafts, arms connected respectively with the shafts and mounting the floats, one of the shafts and its float being operable independently of the other.

3. In a device of the class described, a pipe for connection with a hydraulic ram, a valve for closing the pipe, and means controlling the valve, said means including a float for opening the valve, a second float, and interengaging devices movable toward each other about parallel axes and acting to retard the movement of the first named float when the water level rises, beneath said float, prior to discharge through the pipe.

4. In a device of the class described, a pipe for discharging water from a reservoir, a valve for closing the pipe, and means controlling the valve, said means including a float, an element rocked by the movement of the float, retaining devices on said element, and latches movable in opposite directions about parallel axes, for cooperation with the retaining devices in holding the valve in open position and in closed position.

5. In a device of the class described, a pipe for discharging water from a reservoir, a valve for closing the pipe, and means controlling the valve, said means including a plurality of floats, arms mounting the floats, a shaft rocked upon movement of one of the arms, and devices controlled by the other arm for retaining the shaft against movement, and for releasing the shaft, said retaining and releasing devices being operable for the open position of the valve and the closed position thereof.

6. In a device of the class described, a pipe for discharging water from a reservoir, to a ram or the like, a valve for closing the pipe, a rock shaft, an arm rigid with the shaft, a second arm movable angularly about the shaft, floats carried by the arms, one of the arms being connected with the valve, and means controlled by the other arm for locking the shaft and releasing the valve, said means including a bracket mounted on the rock shaft, engaging devices on the bracket, and elements movable about parallel axes, in opposite directions, for cooperation with the engaging devices.

7. In an apparatus of the class described, means for confining a body of water, a float controlled by the water level in said means and acting to control the flow of water therefrom, and a second float mechanically controlling the float first named and devices retarding the effective operation thereof, in opening the valve, the floats being movable about the same axis, and the retarding devices being movable about parallel axes.

8. The combination with a tank having an outlet and a valve controlling the outlet, of a rock shaft, a float and devices connected therewith for rocking the shaft, a second float and a supporting arm therefor movable angularly with reference to the shaft, an element to be rocked with the shaft, stops carried by said element, latches for engaging the stops, arms mounting the latches, and devices operating with the arm first named and connected with the latch arms for controlling the latches by the movement of one of the floats, incident to a change in the water level in the tank.

9. In a device of the class described, a reservoir, a float therein, an arm mounting the float, a shaft mounting the arm and rocked thereby upon movement of the float incident to change in the water level, an element rigid with the shaft, an adjustable and reversible stop on said element, a latch for engaging the stop and temporarily preventing the rocking of the shaft, and means for releasing the latch.

10. In a device of the class described, a reservoir, a float therein, an arm mounting the float, a shaft mounting the arm and rocked thereby, an element rigid with the arm, an adjustable stop on said element, a latch for engaging the stop and temporarily locking the shaft, and means automatically operated for releasing the latch.

In testimony whereof I affix my signature.

FRANK STOFFER.